United States Patent
Maruvada et al.

(10) Patent No.: US 7,597,961 B2
(45) Date of Patent: Oct. 6, 2009

(54) AUTHENTICATABLE ARTICLE AND METHOD OF AUTHENTICATING

(75) Inventors: Sriramakrishna Maruvada, Evansville, IN (US); Radislav Potyrailo, Niskayuna, NY (US); Philippe Schottland, Evansville, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 147 days.

(21) Appl. No.: 10/889,913

(22) Filed: Jul. 13, 2004

(65) Prior Publication Data

US 2006/0033325 A1    Feb. 16, 2006

(51) Int. Cl.
    B32B 27/36    (2006.01)
(52) U.S. Cl. .................. 428/412; 428/447; 428/913; 428/916; 428/917
(58) Field of Classification Search ............... 428/64.1, 428/64.2, 64.7, 64.8, 411.1, 412, 447, 450, 428/480, 195.1, 913, 916, 917
    See application file for complete search history.

(56) References Cited

U.S. PATENT DOCUMENTS

| | | | |
|---|---|---|---|
| 3,635,895 A | 1/1972 | Kramer | 260/47 XA |
| 4,001,184 A | 1/1977 | Scott | 260/47 XA |
| 4,217,438 A | 8/1980 | Brunelle et al. | 528/202 |
| 4,238,524 A | 12/1980 | LaLiberte et al. | 427/7 |
| 4,699,510 A | 10/1987 | Alguard | |
| 4,813,973 A | 3/1989 | Borge et al. | |
| 4,874,188 A | 10/1989 | Gravisse et al. | |
| 5,005,873 A * | 4/1991 | West | 283/92 |
| 5,030,697 A | 7/1991 | Bomer et al. | |
| 5,124,018 A | 6/1992 | Furuya et al. | |
| 5,128,419 A | 7/1992 | Fong et al. | |
| 5,137,364 A | 8/1992 | McCarthey | |
| 5,142,018 A | 8/1992 | Sakashita et al. | 528/199 |
| 5,151,491 A | 9/1992 | Sakashita et al. | 528/199 |
| 5,201,921 A | 4/1993 | Luttermann et al. | 8/506 |
| 5,314,072 A | 5/1994 | Frankel et al. | 209/44.1 |

(Continued)

FOREIGN PATENT DOCUMENTS

AU            571276 B2    4/1988

(Continued)

OTHER PUBLICATIONS

International Search Report; International Application No. PCT/US2005/024313; International Filing Date Jul. 7, 2005; Date of Mailing Feb. 13, 2006; 4 pages.

(Continued)

*Primary Examiner*—Thao T. Tran (57) ABSTRACT

An authenticatable article can comprise a polymer layer comprising a first taggant, and a second taggant disposed adjacent to the first taggant. The relative relationship of the first taggant and the second taggant can be such that at least one of the first taggant and the second taggant can cause an alteration in an emission from the other of the first taggant and the second taggant. One method of authenticating an article comprises illuminating an article and determining if an altered emission is within a selected emission range. The article comprises a polymer layer and a coating disposed on a side of the polymer layer. The polymer layer comprises a first taggant, and the coating causes a predetermined alteration in an emission from the taggant to form the altered emission.

20 Claims, 4 Drawing Sheets

U.S. PATENT DOCUMENTS

| | | | |
|---|---|---|---|
| 5,326,692 A | 7/1994 | Brinkley et al. ................. 435/6 |
| 5,329,127 A | 7/1994 | Becker et al. ............ 250/459.1 |
| 5,425,978 A | 6/1995 | Berneth et al. |
| 5,510,619 A | 4/1996 | Zachmann et al. ...... 250/339.08 |
| 5,553,714 A | 9/1996 | Cushman et al. ............ 209/577 |
| 5,573,909 A | 11/1996 | Singer et al. .................... 435/6 |
| 5,703,229 A | 12/1997 | Krutak et al. ............... 540/140 |
| 5,719,948 A | 2/1998 | Liang |
| 5,838,451 A | 11/1998 | McCarthy |
| 5,867,586 A | 2/1999 | Liang |
| 5,903,340 A * | 5/1999 | Lawandy et al. ............... 356/71 |
| 5,925,716 A | 7/1999 | Fu et al. |
| 6,099,930 A * | 8/2000 | Cyr et al. .................... 428/64.1 |
| 6,160,787 A | 12/2000 | Marquardt et al. |
| 6,165,592 A * | 12/2000 | Berger et al. ............. 428/195.1 |
| 6,174,400 B1 * | 1/2001 | Krutak et al. ............... 428/32.6 |
| 6,219,329 B1 | 4/2001 | Kojima et al. |
| 6,251,680 B1 | 6/2001 | Fu et al. |
| 6,297,508 B1 | 10/2001 | Barmore et al. |
| 6,355,420 B1 | 3/2002 | Chan |
| 6,380,547 B1 | 4/2002 | Gonzalez et al. |
| 6,514,617 B1 | 2/2003 | Hubbard et al. ............. 428/412 |
| 6,589,626 B2 | 7/2003 | Selinfreund et al. ........ 428/64.1 |
| 6,627,299 B1 | 9/2003 | Feng et al. |
| 6,638,593 B2 | 10/2003 | Sellnfreund et al. |
| 6,707,539 B2 | 3/2004 | Selinfreund et al. ........... 356/71 |
| 7,094,364 B2 * | 8/2006 | Potyrailo et al. ......... 252/408.1 |
| 7,241,489 B2 | 7/2007 | Argoitia et al. |
| 7,250,612 B2 | 7/2007 | Pai-Paranjape et al. |
| 2002/0122878 A1 | 9/2002 | Kerns et al. |
| 2002/0195586 A1 | 12/2002 | Auslander et al. |
| 2003/0012562 A1 | 1/2003 | Lawandy et al. |
| 2003/0180482 A1 | 9/2003 | Narita et al. |
| 2005/0095715 A1 | 5/2005 | Hubbard et al. |
| 2005/0110978 A1 | 5/2005 | Potyrailo et al. |
| 2005/0111342 A1 | 5/2005 | Morris et al. |
| 2005/0112768 A1 | 5/2005 | Evans et al. |
| 2007/0071951 A1 | 3/2007 | Grande et al. |

FOREIGN PATENT DOCUMENTS

| | | |
|---|---|---|
| EP | 0 121 261 | 10/1984 |
| EP | 0 181 228 | 1/1993 |
| EP | 0 609 493 | 1/1999 |
| EP | 1 220 165 | 7/2002 |
| GB | 1 170 965 | 11/1969 |
| GB | 2264558 A | 9/1993 |
| GB | 2330408 A | 4/1999 |
| WO | WO 98/31011 | 7/1998 |
| WO | WO 00/14736 | 3/2000 |
| WO | 0124107 A2 | 4/2001 |
| WO | WO 03/087888 A2 | 10/2003 |
| WO | WO 03/105075 | 12/2003 |

OTHER PUBLICATIONS

Written Opinion of the International Searching Authority; International Application No. PCT/US2005/024313; International Filing Date Jul. 7, 2005; Date of Mailing Feb. 13, 2006; 2 pages.

European Patent No. EP 0147252; Publication Date: Jul. 3, 1985; Abstract Only; 1 page.

Written Opinion of the International Searching Authority; International Application No. PCT/US2005/024313; International Filing Date: Jul. 7, 2005; Date of Mailing: Feb. 13, 2006; 5 pages.

* cited by examiner

---- 4-clear
—— 4-2

FIG. 7

---- 5-clear
—— 5-2

AUTHENTICATABLE ARTICLE AND METHOD OF AUTHENTICATING

BACKGROUND OF THE INVENTION

In the field of data storage media, digital content owners, such as music companies, movie studios, video game manufacturers, computer software manufacturers, and the like, desire increased flexibility in the distribution of their digital content onto various forms of data storage media. Digital content kiosks are becoming an increasingly popular means for displaying, and in some cases, distributing digital content. Commercially available digital content kiosks utilize a variety of data storage media. However, because these data storage media are pre-mastered, the choice of digital content available to a user is often limited. The costly manufacturing and replication process associated with the data storage media necessitates the production of hundreds to thousands of the data storage media in order to make the production process cost-effective. Thus, the production and distribution of individual or small lots of pre-mastered data storage media is cost-prohibitive.

One possible solution to this problem is the use of write-once or rewritable formats. Such data storage media would allow for the "on-demand" distribution of digital content, expanding the choice of digital content available to a user and eliminating the need for the production of hundreds to thousands of pre-mastered data storage media. However, these data storage media may provide little protection for a digital content owner's intellectual property. A major problem confronting the various makers and users of non-recordable and recordable data storage media such as compact discs (CD), digital versatile discs (DVD), enhanced video discs (EVD), recordable compact discs (CD-R) and recordable digital versatile discs (DVD-R) is the unauthorized reproduction or copying of information by unauthorized manufacturers, sellers, and/or users. Such unauthorized reproduction or duplication of data storage media is often referred to as piracy. Piracy may occur in a variety of ways, including consumer level piracy at the point of end use as well as wholesale duplication of data, substrate and anti-piracy information at the commercial level. Regardless of the manner, piracy of data storage media deprives legitimate digital content providers and manufacturers of significant revenue and profit.

Attempts to stop piracy at the consumer level have included the placement of electronic anti-piracy signals on information carrying substrates along with the information sought to be protected. The machine readers and players of such data storage media are configured to require the identification of such anti-piracy signals prior to allowing access to the desired information. Theoretically, consumer level duplications are unable to reproduce these electronic anti-piracy signals on unauthorized copies and hence result in duplicates and copies that are unusable.

However, numerous technologies to thwart such consumer level anti-piracy technologies have been and continue to be developed. Moreover, commercial level duplications have evolved to the point that unauthorized duplicates may now contain the original electronic anti-piracy circuit, code, etc. For example, commercial level duplication methods include pit copying, radio frequency (RF) copying, "bit to bit" copying and other mirror image copying techniques which result in the placement of the anti-piracy signal along with the information carrying substrate of the duplicate along with the information sought to be protected. Other technologies commonly used by hackers include the modification of the computer code in order to remove anti-piracy (also referred to as copy-protection or copy-proofing) features and enable unlimited access to the data.

It would be desirable to have a data storage media that can be easily identified as to being authentic or pirated. One anti-piracy technology aimed at combating these more sophisticated consumer and commercial level reproduction and copying practices involves the placement of 'tags' or authentication markers in substrates used in the construction of data storage media. Such tags or authentication markers can be detected at one or more points along the data storage media manufacturing or distribution chain or by the end use reader or player used to access the data on a particular data storage media.

The automated identification of plastic compositions used in data storage media is very desirable for a variety of applications, such as recycling, tracking the manufacturing source, antipiracy protection, and others. Furthermore, it may be desirable for automated authentication of the data storage media. Despite the foregoing, there still remains a need for methods of tagging and authenticating storage media.

SUMMARY

This disclosure relates to tagged articles and methods for authenticating. In one embodiment, an authenticatable article can comprise a polymer layer comprising a first taggant, and a second taggant disposed adjacent to the first taggant. The relative relationship of the first taggant and the second taggant can be such that at least one of the first taggant and the second taggant can cause an alteration in an emission from the other of the first taggant and the second taggant.

One method of authenticating an article comprises illuminating an article and determining if an altered emission is within a selected emission range. The article comprises a polymer layer and a coating disposed on a side of the polymer layer. The polymer layer comprises a first taggant, and the coating causes a predetermined alteration in an emission from the taggant to form the altered emission.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

It is noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt %, with 5 wt % to 20 wt % desired," are inclusive of the endpoints and all intermediate values of the ranges of "5 wt % to 25 wt %," etc.). As used herein the term "about", when used in conjunction with a number in a numerical range, is defined being as within one standard deviation of that number.

A polymeric substrate tagged with a fluorophore can be authenticated. The taggant can be incorporated into the polymer during polymerization, compounding or forming of the article. Layer(s) on the substrate (e.g., a coating, film, or printed layer) can comprise a compound having optical properties that alter, in a predetermined fashion, the fluorescence emission from the polymeric substrate. The alteration of the fluorescence emission from the substrate by this layer could be either re-emission of the signal at a different wavelength (i.e., fluorescence "cross-talk" or energy transfer), enhancement of the intensity of the emission (e.g., where the fluorophore in the coating absorbs and shifts energy to increase the excitation of the taggant in the polymer), and/or partial/complete absorption of the signal. Optionally, more than 2 adjacent layers can be used. For example, the coating can be made of several layers comprising dyes that will have a fluorescence interaction in a synergistic manner.

Alteration, e.g., a significant effect on certain part of either the excitation or the emission spectrum of the taggant in the polymer, occurs when there is interference with the emission wavelengths (or with the excitation wavelengths). A synergistic alteration (i.e., the emission of the taggant is not only reduced by just blocking emission or excitation wavelengths but an energy transfer occurs between the layers (more exactly between the fluorophores in the 2 layers)), enhances authentication accuracy. The alteration is significant if the energy transfer is measurable by the selected detection system, e.g. the ability to see emissions from the 2 systems or only from the system that should not be excited at this wavelength.

The alteration of the fluorescence emission from the substrate by this coating layer could be also as a partial/complete absorption of the signal known as primary and secondary inner filter effects. A primary inner filter effect is related to absorption of excitation radiation. A secondary inner filter effect is related to absorption of emission radiation. Where partial absorption of the signal occurs, alteration of the signal is a change of greater than or equal to about 10%. Specifically, a change of greater than or equal to 30%, more specifically, greater than or equal to about 50%, and even more specifically greater than or equal to about 70%, and yet more specifically greater than or equal to about 90%, and even more specifically greater than or equal to about 95%, and yet even more specifically greater than or equal to about 99%.

In one embodiment where the article is a multi-layered optical disk such as a DVD, the first fluorophore can be dispersed (e.g., homogenously) in the first substrate whereas the second fluorophore that has a synergistic interaction with the first fluorophore can be present in the second substrate. In this embodiment, the emission from the one substrate excites the fluorophore in the other substrate (e.g., where the metal layer therebetween is at least semi-transparent). In an alternate embodiment, the second fluorophore (e.g., complementary fluorophore) that has a synergistic interaction with the first fluorophore can be dispersed in the adhesive layer between the first and the second substrate. In yet another embodiment, if at least a portion of the complementary fluorophore (or optionally the first fluorophore) can be made dysfunctional using a secondary process (e.g., such as laser etching, laser marking, photomasking, photodegradation, and/or the like), then a pattern (e.g., design, marking, code, or the like) can be created in the portion of the article (e.g., disk) comprising the first fluorophore. In yet another embodiment, if the complementary fluorophore is in the jewel box or casing housing the optical disk, then, excitation of the fluorophore in the optical media, can trigger a secondary fluorophore present in the jewel box, thereby causing a reaction (e.g., a design/pattern to appear).

In yet another embodiment, the article is a multi-layered article obtained by processing methods such as co-extrusion, co-injection, in-mold decoration (IMED), and the like, as well as combinations comprising at least one of the foregoing methods. Examples of such articles include, but are not limited to, co-extruded/laminated films wherein a first fluorophore can be located in the first layer and the second fluorophore can be located in an adjacent layer. An example of a method to authenticate such multi-layered articles containing a first and a second fluorophore may be the illumination of the first layer of the article under a specific light source at a wavelength(s) exciting the first fluorophore and checking that the article emits the expected fluorescence from the two layers (i.e., that the fluorescence cross-talk occurs). In one specific embodiment, the multi-layered article would emit two different colors (e.g., one for each side of the article) while being excited only from one side of the article at a wavelength selected so that it does not directly excite the second fluorophore.

In one embodiment, only a portion of the disk will be authenticatable. In a further embodiment, the authenticatable portion will be located in the inside diameter portion of the disk which is typically non-metallized and the disk can be placed between the light source and the detector during authentication or with the detector and light source (e.g., radiation source) on the same side of the media. In another embodiment, the authenticatable portion will be located in a metallized area and both the light source and the detector will be located on the same side of the disk during authentication, or, if the metallized area is at least semitransparent, may be located between the detector and light source during authentication.

In one embodiment, the authentication will take place in an optical disk drive such as CD or a DVD player. In a further embodiment, the light source will be the read laser, wherein the read laser may detect a disk identification code by reading the emission from the test portion. In yet another further embodiment, the test portion can be a coated area and the coated area may be located in the BCA (Burst Control Area)

or lead-in region of the disk. Various combinations of any of the above described embodiments are also contemplated.

In yet another embodiment, the fluorophores are disposed in a semi-transparent or opaque article. For example, an opaque part with the first fluorophore can interact with a second fluorophore layer (e.g., a barcode, serial number, pattern, coating (full or partial), marking, or the like), wherein the second fluorophore layer is optionally not visible before authentication. For example, the authentication method can probe the presence of each individual fluorophore in their respective layer/location and confirm the expected synergistic interaction between the fluorophores.

Examples of material for the tagged polymer layer (e.g., a substrate) include, amorphous, crystalline, and/or semi-crystalline thermoplastic materials, such as: polyvinyl chloride, polyolefins (including linear and cyclic polyolefins and including polyethylene, chlorinated polyethylene, polypropylene, and the like), polyesters (including polyethylene terephthalate, polybutylene terephthalate, polycyclohexylmethylene terephthalate, and the like), polyamides, polysulfones (including hydrogenated polysulfones, and the like), polyimides, polyether imides, polyether sulfones, polyphenylene sulfides, polyether ketones, polyether ether ketones, ABS resins, polystyrenes (including hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including polymethylmethacrylate, methyl methacrylate-polyimide copolymers, and the like), polyacrylonitrile, polyacetals, polycarbonates, polyphenylene ethers (including those derived from 2,6-dimethylphenol and copolymers with 2,3, 6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, polytetrafluorethylene, as well as thermosetting resins such as epoxy, phenolic, alkyds, polyester, polyimide, polyurethane, mineral filled silicone, bis-maleimides, cyanate esters, vinyl, and benzocyclobutene resins, in addition to combinations, blends, copolymers, mixtures, reaction products, and composites comprising at least one of the foregoing. Non-limiting examples of such polymers include polycarbonate, polycarbonate-siloxane copolymers, and transparent polycarbonate-polyester blends, as well as combinations comprising at least one of the foregoing polymers, such as Xylex™ polycarbonate/polyester blend (commercially available from GE Plastics, Pittsfield, Mass.).

As discussed above, various polymer compositions can be employed, wherein the material is transparent, semi-transparent, or opaque; i.e., in a system comprising polymer composition with a second fluorophore having a synergy with the first fluorophore. The disclosed method and associated articles, however, are particularly useful, where the polymer composition (i.e., the portion of the article comprising the second fluorophore), is a transparent or translucent polymer having a minimum or no absorption (i.e., no measurable absorption) at the key wavelengths (i.e., the excitation wavelength(s) of the first fluorophore, and the emission wavelength of the first/second/both fluorophore) of the fluorophores. Examples of such polymer compositions include acrylate, epoxy, polyester, polyurethane, polystyrene, polyvinyl alcohol, polyhydroxystyrene and silicone, as well as combinations comprising at least one of the foregoing. Other amorphous polymers, such as polycarbonate, can be used, for example, by dissolving both the fluorophore and the polycarbonate in a common solvent (e.g., methylene chloride, chloroform, tetrahydrofuran, toluene, or the like).

Possible polymer compositions may also include various additives. Such additives are, for example, fillers and/or reinforcing agents; heat stabilizers; antioxidants; light stabilizers; plasticizers; antistatic agents; flame retardants; mold releasing agents; additional resins; blowing agents; and the like, as well as combinations comprising at least one of the foregoing additives. Examples of fillers or reinforcing agents may include glass fibers, asbestos, carbon fibers, silica, talc, calcium carbonate, and the like. Examples of heat stabilizers may include triphenyl phosphite, tris-(2,6-dimethylphenyl) phosphite, tris-(mixed mono- and di-nonylphenyl)phosphite, dimethylbenene phosphonate, trimethyl phosphate, and the like. Examples of antioxidants may include octadecyl-3-(3, 5-di-tert-butyl-4-hydroxyphenyl)propionate, pentaerythrityl-tetrakis[3-(3,5-di-tert-butyl-4-hydroxyphenyl)propionate], and the like. Examples of light stabilizers may include 2-(2-hydroxy-5-methylphenyl)benzotriazole, 2-(2-hydroxy-5-tert-octylphenyl)-benzotriazole, 2-hydroxy-4-n-octoxy benzophenone, and the like. Examples of plasticizers may include dioctyl-4,5-epoxy-hexahydrophthalate, tris-(octoxycarbonylethyl)isocyanurate, tristearin, epoxidized soybean oil, and the like. Examples of the antistatic agent may include glycerol monostearate, sodium stearyl sulfonate, sodium dodecylbenzenesulfonate, and the like. Examples of mold releasing agents may include stearyl stearate, beeswax, montan wax, paraffin wax, and the like. Examples of additional resins may include but are not limited to polypropylene, polystyrene, polymethyl methacrylate, polyphenylene oxide, and the like. Combinations of any of the foregoing additives may be used. Such additives may be mixed at a suitable time during the mixing of the components for forming the composition.

In order to be able to authenticate the article (e.g., data storage media), a polymer layer (e.g., the substrate) includes an identifier, e.g., a taggant, such as a fluorescent dye, or the like, capable of producing a detectable photoluminescence when excited. Optionally, the polymer may exhibit intrinsic photoluminescence such that it is not necessary to add a taggant in order to produce a detectable photoluminescence. For example, the Fries Product may be detected in polycarbonate by use of fluorescence spectroscopy, wherein, Fries Products occur when the polymer backbone undergoes a chemical rearrangement (e.g., a Fries rearrangement in the case of polycarbonate) leading to the formation of photoluminescent entities. In another embodiment, a fluorescent monomer is copolymerized into the backbone or endcap of the polymer. In yet another embodiment, the fluorescence properties may be intrinsic to the polymer (i.e., "backbone" fluorescence). Optionally, the layer can comprise an optically variable tag, e.g., a compound that has a fluorescence emission that changes in fluorescence intensity and/or wavelength as a function of time. In one embodiment, the media may be designed to be evaluated several times, i.e., the authenticating signal is repeatable, while in other embodiments the authenticating signal may be capable of evaluation only once due to the use of optically variable tags that, for example, degrade after one or more authentication sequences. In one exemplary embodiment, the authenticatable polymer will comprise an optically variable tag that can be authenticated multiple times, i.e., for example, at various points during use in an optical device or kiosk. Optionally, two or more of the above embodiments can be combined to attain the desired layer. Due to the desired interaction between the substrate and the other layer, choice of the identifier depends upon the choice of the layer used in conjunction with the substrate.

Suitable optically variable tags are generally fluorescent or luminescent materials that are selected to be chemically compatible with the polymer and have a heat stability consistent with engineering plastics compounding and in particular with the processing conditions of the portion of the media in which they are included (e.g., the polymer substrate).

Possible optically variable tags include oxadiazole derivatives, luminescent conjugated polymers, and the like. Illustrative examples of suitable luminescent conjugated polymers are blue emitting luminescent polymers, such as poly-paraphenylenevinylene derivatives. Illustrative examples of suitable oxadiazole derivatives include oxadiazole derivatives substituted with a biphenyl or substituted biphenyl in the 2-position and with a phenyl derivative in the 5-position. For example, tert-butyl phenyl oxadiazole, bis(biphenylyl) oxadiazole, as well as mixtures comprising at least one of these tags.

Alternatively, and or in addition, the tag may be a non-optically variable compound. Non-optically variable compounds comprise luminescent tags, and optionally luminescent tags that are selected to enhance the signal from optically variable tags when used in combination. Luminescent tags include an organic fluorophore, an inorganic fluorophore, an organometallic fluorophore, a phosphorescent material, a luminescent material, semiconducting luminescent nanoparticle, and the like, as well as combinations comprising at least one of the foregoing tags.

In an exemplary embodiment, the luminescent tags are selected from classes of dyes that exhibit high robustness against ambient environmental conditions and temperature stability of greater than or equal to about 350° C., preferably greater than or equal to about 375° C., and more preferably greater than or equal to about 400° C. It is desirable to have optically variable tags and/or luminescent tags hidden behind the matrix absorption. The matrix is defined herein as the backbone absorption from the media (e.g., in the substrate) or from any additive or colorant present in the substrate. Alternatively, it is desirable to have optically variable tags and/or luminescent tags with a peak excitation wavelength outside the visible (e.g. in the ultraviolet range) and a peak emission in the visible or in the near infrared region of the spectrum. When the difference between the excitation and the emission peak is greater than about 50 nm, these compounds are usually referred to as long (positive) stokes shift dyes. In an exemplary embodiment, the luminescent tags are selected from the classes of long stokes shift dyes that are excited by long ultraviolet wavelengths and emit in the visible. For example, the first tag (e.g., fluorophore) can have long stokes shift properties to ensure detection of the presence of the second tag (e.g., fluorophore) without triggering (or at least minimizing) excitation of the first tag.

Illustrative luminescent tags include fluorescent tags for example, dyes such as polyazaindacenes and/or coumarins (including those set forth in U.S. Pat. No. 5,573,909); lanthanide complexes, hydrocarbon and substituted hydrocarbon dyes; polycyclic aromatic hydrocarbons; scintillation dyes (e.g., oxazoles and oxadiazoles); aryl- and heteroaryl-substituted polyolefins ($C_2$-$C_8$ olefin portion); carbocyanine dyes; phthalocyanine dyes and pigments; oxazine dyes; carbostyryl dyes; porphyrin dyes; acridine dyes; anthraquinone dyes; anthrapyridone dyes; naphtalimide dyes; benzimidazole derivatives; arylmethane dyes; azo dyes; diazonium dyes; nitro dyes; quinone imine dyes; tetrazolium dyes; thiazole dyes; perylene dyes; perinone dyes; bis-benzoxazolylthiophene (BBOT); xanthene and thioxanthene dyes; indigoid and thioindigoid dyes; chromones and flavones derivatives, and the like, as well as combinations comprising at least one of the fluorescent tags disclosed herein. Luminescent tags also include anti-stokes shift dyes that absorb in the near infrared wavelength and emit in the visible wavelength. Desirably, fluorophore(s) having a sufficient heat stability to be detectable after processing and forming of the article are employed, such as the use of the fluorophores disclosed in U.S. Pat. No. 6,514,617, which is commonly assigned herewith, used in polycarbonate or engineering thermoplastics with similar or higher processing temperatures.

The following is a partial list of some fluorescent and/or luminescent dyes: 5-amino-9-diethyliminobenzo(a)phenoxazonium perchlorate-7-amino-4-methylcarbostyryl, 7-amino-4-methylcoumarin, 7-Amino-4-trifluoromethylcoumarin, 3-(2'-benzimidazolyl)-7-N,N-diethylaminocoumarin, 3-(2'-benzothiazolyl)-7-diethylaminocoumarin, 2-(4-biphenylyl)-5-(4-t-butylphenyl)-1,3,4-oxadiazole, 2-(4-biphenylyl)-5-phenyl-1,3,4-oxadiazole, 2-(4-biphenyl)-6-phenylbenzoxazole-1,3, 2,5-Bis-(4-biphenylyl)-1,3,4-oxadiazole, 2,5-bis-(4-biphenylyl)-oxazole, 4,4'-bis-(2-butyloctyloxy)-p-quaterphenyl, p-bis(o-methylstyryl)-benzene, 5,9-diaminobenzo(a)phenoxazonium perchlorate, 4-dicyanomethylene-2-methyl-6-(p-dimethylaminostyryl)-4H-pyran, 1,1'-diethyl-2,2'-carbocyanine iodide, 1,1'-diethyl-4,4'-carbocyanine iodide, 3,3'-diethyl-4,4',5,5'-dibenzothiatricarbocyanine iodide, 1,1'-diethyl-4,4'-dicarbocyanine iodide, 1,1'-diethyl-2,2'-dicarbocyanine iodide, 3,3'-diethyl-9,11-neopentylenethiatricarbocyanine iodide, 1,3'-diethyl-4,2'-quinolyloxacarbocyanine iodide, 1,3'-diethyl-4,2'-quinolylthiacarbocyanine iodide, 3-diethylamino-7-diethyliminophenoxazonium perchlorate, 7-diethylamino-4-methylcoumarin, 7-diethylamino-4-trifluoromethylcoumarin, 7-diethylaminocoumarin, 3,3'-diethyloxadicarbocyanine iodide, 3,3'-diethylthiacarbocyanine iodide, 3,3'-diethylthiadicarbocyanine iodide, 3,3'-diethylthiatricarbocyanine iodide, 4,6-dimethyl-7-ethylaminocoumarin, 2,2'-dimethyl-p-quaterphenyl, 2,2-dimethyl-p-terphenyl, 7-dimethylamino-1-methyl-4-methoxy-8-azaquinolone-2, 7-dimethylamino-4-methylquinolone-2, 7-dimethylamino-4-trifluoromethylcoumarin, 2-(4-(4-dimethylaminophenyl)-1,3-butadienyl)-3-ethylbenzothiazolium perchlorate, 2-(6-(p-dimethylaminophenyl)-2,4-neopentylene-1,3,5-hexatrienyl)-3-methylbenzothiazolium perchlorate, 2-(4-(p-dimethylaminophenyl)-1,3-butadienyl)-1,3,3-trimethyl-3H-indolium perchlorate, 3,3'-dimethyloxatricarbocyanine iodide, 2,5-diphenylfuran, 2,5-diphenyloxazole, 4,4'-diphenylstilbene, 1-ethyl-4-(4-(p-dimethylaminophenyl)-1,3-butadienyl)-pyridinium perchlorate, 1-ethyl-2-(4-(p-dimethylaminophenyl)-1,3-butadienyl)-pyridinium perchlorate, 1-ethyl-4-(4-(p-dimethylaminophenyl)-1,3-butadienyl)-quinolium perchlorate, 3-ethylamino-7-ethylimino-2,8-dimethylphenoxazin-5-ium perchlorate, 9-ethylamino-5-ethylamino-10-methyl-5H-benzo(a)phenoxazonium perchlorate, 7-ethylamino-6-methyl-4-trifluoromethylcoumarin, 7-ethylamino-4-trifluoromethylcoumarin, 1,1',3,3,3',3'-Hexamethyl-4,4',5,5'-dibenzo-2,2'-indotricarboccyanine iodide, 1,1',3,3,3',3'-Hexamethylindodicarbocyanine iodide, 1,1',3,3,3',3'-Hexaamethylindotricarbocyanine iodide, 2-methyl-5-t-butyl-p-quaterphenyl, N-methyl-4-trifluoromethylpiperidino-<3,2-g>coumarin, 3-(2'-N-methylbenzimidazolyl)-7-N,N-diethylaminocoumarin, 2-(1-naphthyl)-5-phenyloxazole, 2,2'-p-phenylen-bis(5-phenyloxazole), 3,5,3'''',5''''-tetra-t-butyl-p-sexiphenyl, 3,5,3'''',5''''-tetra-t-butyl-p-quinquephenyl, 2,3,5,6-1H,4H-tetrahydro-9-acetylquinolizino-<9,9a,1-gh>coumarin, 2,3,5,6-1H,4H-tetrahydro-9-carboethoxyquinolizino-<9,9a,1-gh>coumarin, 2,3,5,6-1H,4H-tetrahydro-8-methylquinolizino-<9,9a,1-gh>coumarin, 2,3,5,6-1H,4H-tetrahydro-9-(3-pyridyl)- quinolizino-<9,9a,1-gh>coumarin, 2,3,5,6-1H,4H-tetrahydro-8-trifluoromethylquinolizino-<9,9a,1-gh>coumarin, 2,3,5,6-1H,4H-tetrahydroquinolizino-<9,9a,1-gh>coumarin, 3,3',2''',3'''-tetramethyl-p-quaterphenyl, 2,5,2''',5'''-tetramethyl-p-quinquephenyl, p-terphenyl, p-quaterphenyl, nile red, rhodamine 700, oxazine 750, rhodamine 800, IR 125, IR 144, IR 140, IR 132, IR 26, IR5, diphenylhexatriene, diphenylbutadiene, tetraphenylbutadiene, naphthalene, anthracene, 9,10-diphenylanthracene, pyrene, chrysene, rubrene, coronene, phenanthrene; and the like, as well as combinations comprising at least one of the foregoing.

Luminescent tags may include luminescent nanoparticles having a size (measured along a major diameter) of about 1 nanometer (nm) to about 50 nanometers. Exemplary luminescent nanoparticles include rare earth aluminates (such as strontium aluminates doped with europium and dysprosium, and the like); semi-conducting nanoparticles (such as CdSe, CdTe, CdS, ZnS, $Cd_3P_2$, PbSe, and the like, including core-shell particles such as CdSe/ZnS, CdTe/CdS, and the like); and the like as well as combinations comprising at least one of the foregoing. In one embodiment, fluorescent tags such as perylenes (such as anthra[2,1,9-def:6,5,10-d'e'f']diisoquinoline-1,3,8,10(2H,9H)-tetrone, 2,9-bis[2,6-bis(1-methyethyl)phenyl]-5,6,12,13-tetraphenoxy) are utilized as the luminescent tags.

The concentration of the luminescent tags depends on the quantum efficiency of the tag, excitation and emission wavelengths, and employed detection techniques, and will generally be present in an amount of about $10^{-18}$ weight percent (wt %) to about 2 wt %, based upon a total weight of the substrate (or layer in which the tag is present), optionally in an amount of about $10^{-8}$ wt % to about 0.5 wt %, and typically in an amount of about $10^{-5}$ wt % to about 0.05 wt %.

To further enhance authentication, the polymer compositions may also contain colorants. These colorants may, for example, impart a specific appearance to the tagged polymer or tagged data storage media under normal lighting conditions (e.g., daylight). In general, these background colorants have an affect on the photoluminescence properties of the tagged polymer by filtering some of the excitation wavelength(s) and/or some of the emission wavelength(s). To enable facile and accurate authentication of the storage media, it is desirable that any colorants used do not interfere with the photoluminescent emissions. It is also desirable to limit the filtering effect of the colorants on the excitation wavelengths by selecting molecules that have the minimum impact. Understanding the filtering effect and proper selection of the colorants can be performed by those skilled in art by considering the absorption spectrum of the colorants, the excitation spectrum of the taggant or tagged polymer and the spectral distribution of the light source used for the excitation. For example, the colorant could exhibit no or only very weak fluorescence under UV excitation compared to the taggant (e.g., fluorescent dye). Suitable colorants may include non-fluorescent derivatives of the following dye families: anthraquinones, methine, perinones, azo, anthrapyridones, quinophtalones, and the like, as well as combinations comprising at least one of the foregoing colorants.

It is noted that the above layer compositions as well as taggants and optical identifiers are merely exemplary. The disclosed method utilizes an optical interaction between two or more layers (e.g., substrate and a coating on the substrate) to enable authentication of an article comprising these layers.

The "cross-talk" properties of the tags are driven by the selection of the first and second tags (e.g., fluorophores) and the selection of the authentication wavelength(s) to probe for the synergy between the tags. More accurate authentication can be attained via probing at an authentication wavelength where the relative excitation of the second tag (e.g., fluorophore) is significantly less than the relative excitation of the first tag (e.g., fluorophore). Optionally, both (i) a ratio of absorption of the second tag (e.g., coating) to the absorption of the first tag (e.g., polymer layer), and/or (ii) at the detection wavelength, the ratio of the excitation coefficient of second taggant to the excitation coefficient of the first taggant can be sufficiently small enough to attain the desired synergistic reaction between the first and second tags without a degree of noise that inhibits detection of this synergistic reaction, for example less than or equal to about 10%, or more specifically, less than or equal to about 1%, and even more specifically, less than or equal to about 0.1%, and yet more specifically, the second tag will not have any measurable emission as a result of a direct excitation at the authentication wavelength (i.e., the magnitude of the emission is in the order of magnitude of the detector background noise).

As stated above, to enhance authentication accuracy, the fluorophore(s)/optically variable tag(s)/luminescent tag(s) can be chosen to minimize the overlap between the excitation wavelengths of the first and second tags and/or to maximize the overlap between the emission of the first tag and the excitation of the second tag. Minimizing the overlap between the first and second excitation wavelengths is difficult (i.e., it is difficult to find a wavelength or a range of wavelengths to independently excite the first fluorophore without triggering direct excitation of the second fluorophore). Minimization of the overlap can, however, be attained by employing discrete light sources, such as laser(s), diode(s), bandpass filtered source(s), and the like, as well as combinations comprising at least one of the foregoing.

Figure 1:
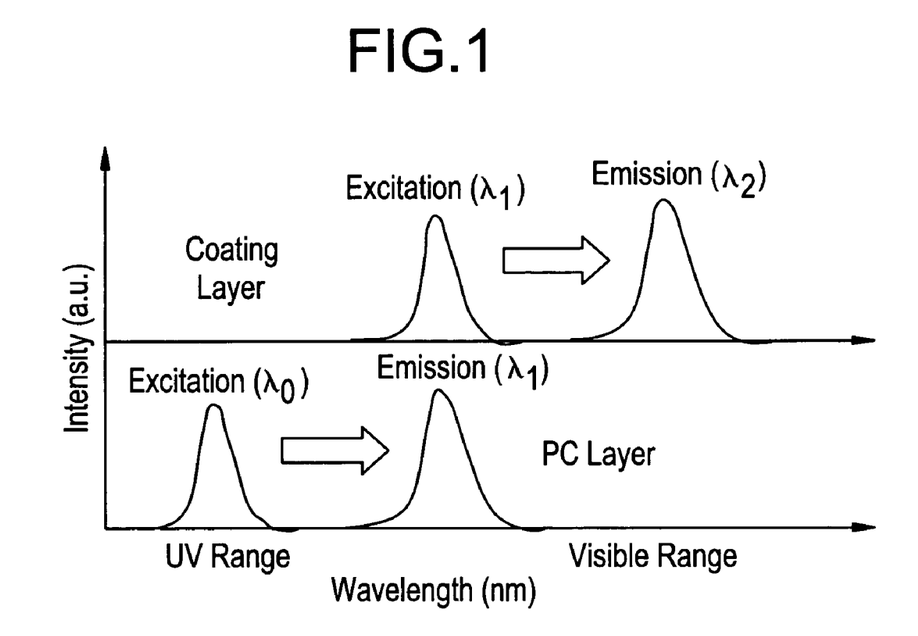
FIG. 1 is a graphical illustration of intensity versus wavelength for a coating layer and a polycarbonate layer.
Figure 2:
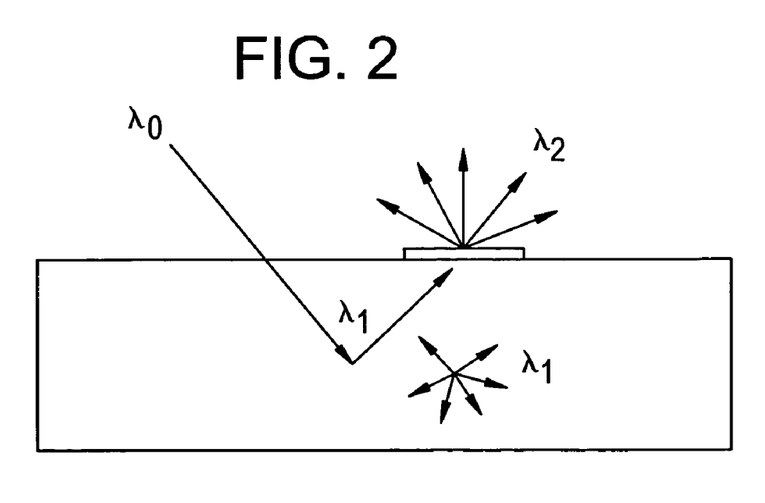
FIG. 2 is a schematic representation of excitation of a fluorophore in a coated substrate (schematically illustrating the system of FIG. 1).

In one exemplary embodiment illustrated in FIGS. 1 and 2, a light source excites the first fluorophore present in the substrate thus triggering the emission of a first fluorescence signal. This emitted signal will then excite the adjacent layer (which contains a second fluorophore) to produce a second fluorescence emission signal different from the first one. The authentication protocol includes analyzing the signal produced by the fluorescence emission from each layer and look for fluorescence synergy (i.e., cross-talk) between layers. In one embodiment, the presence of a fluorescence synergy between adjacent layers will be confirmed by the fluorescence drop at a first wavelength ($\lambda_1$) and the appearance of a second emission at a wavelength characteristic of the adjacent layer emission ($\lambda_2$). Note that the fluorophore and the wavelength (or spectral distribution) of the light source are critical parameters that must be selected in a way such that the light source only (or essentially) excites the fluorophore in the PC.

Figure 3:
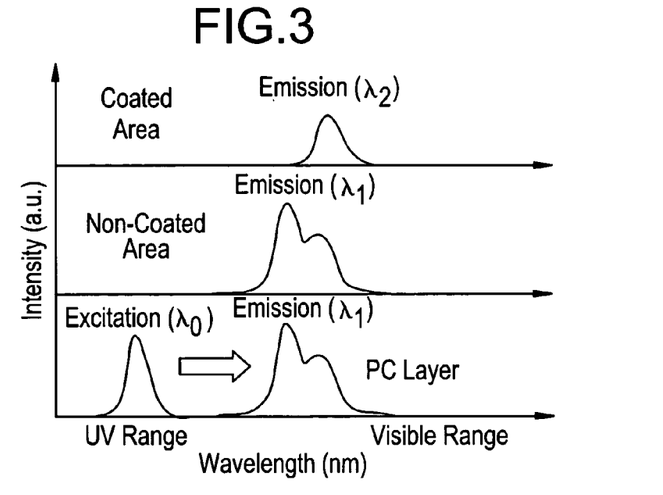
FIG. 3 is a graphical illustration of intensity versus wavelength for a coated area, a non-coated area, and a polycarbonate layer.
Figure 4:
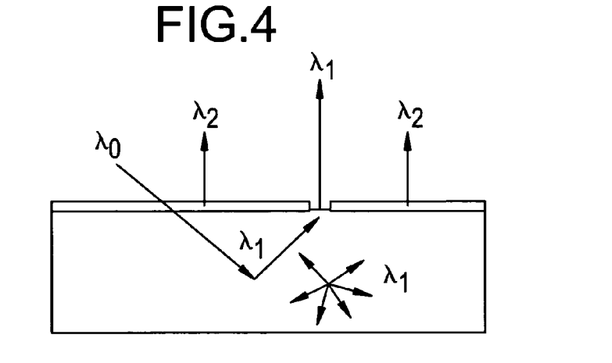
FIG. 4 is a schematic representation of excitation of a fluorophore in a substrate having coated and uncoated areas (schematically illustrating the system of FIG. 3).

In another exemplary embodiment illustrated in FIGS. 3 and 4, a light source excites the first fluorophore present in the substrate triggering the emission of a first fluorescence signal. A coating printed on the surface of the substrate defines a pattern with coated and non-coated areas. The coating selectively absorbs the signal emitted from the substrate (emission $\lambda_1$) creating an altered signal (emission $\lambda_2$). In one embodiment, multiple coated areas can be created, for example, using a printing technique where the composition of the coating will be designed so that the coated areas can have a different (or altered) emission $\lambda_2$. This can be achieved via printing using inks with different compositions, each ink having a different optical interaction with the first fluorescent emission $\lambda_1$. In one embodiment, the local emission $\lambda_2$ can be the absence of emission (i.e., no fluorescence signal), which implies that the first fluorescence signal will be completely absorbed by the coated area (i.e., will not be measurable). Note that when a fully covert security solution is desired, the coating should match the color of the substrate under normal lighting conditions used for the observation of the disk (such as daylight, fluorescent light, halogen light, and the like). In this case, the optical interaction between the substrate and the coating under the excitation wavelength(s) reveals the pattern or security feature. In another embodiment where a fully covert solution is not required, the coating could be made visible with a high contrast over the substrate in order to be detectable using standard detection systems (e.g., barcode readers, optical readers, and the like). In one specific embodiment, the optical interaction under the excitation wavelength would reveal a pattern that is different from the one observed under normal viewing conditions. In yet another embodiment, the pattern originally visible under normal lighting conditions would disappear under the excitation wavelength of the tagged polymer.

EXAMPLES

Two colored disks were prepared using an optical quality ("OQ") polycarbonate resin composition with a number average molecular weight (Mn) of about 17,700 atomic mass units (amu) (obtained by gel permeation chromatography (GPC) against absolute standards), a phosphite heat stabilizer, a mold release agent, and a yellow and an orange non-fluorescent colorant from the methine family. Disk 5 also contained a UV-excitable green benzimidazole fluorophore (i.e., was made from a tagged polymer). Disk 4 did not contain the fluorophore but its appearance under normal lighting conditions was the same as disk 5. Optical disks (CD format) were obtained by injection molding using standard processing conditions for OQ polycarbonate material.

The object of the experiment was to demonstrate the existence of a synergistic interaction between the tagged substrate polymer and the adjacent layer with the second fluorophore (also referred to as the reagent spot) applied onto the substrate, and the ability to use such synergistic interaction to authenticate an article. The reagent was chosen to have no significant emission at the excitation wavelength selected for the tagged polymer (here 355 nm) (e.g., it had a ratio of the excitation of the reagent to the tagged polymer of less than about 1%). Rhodamine 6G was selected as a suitable reagent based on the overlap of its absorption/excitation spectrum with the emission of the tagged polymer used to form the article. A coating formulation was formed by dissolving Rhodamine 6G dye and poly(2-hydroxyethyl methacrylate) polymer in a solvent (for example, 1-methoxy-2-propanol). A small volume (30 microliters) of the resulting solution was applied onto the disk. The solution was dried at room temperature and formed a polymer spot of about 2-3 millimeters (mm) in diameter.

Figure 5:
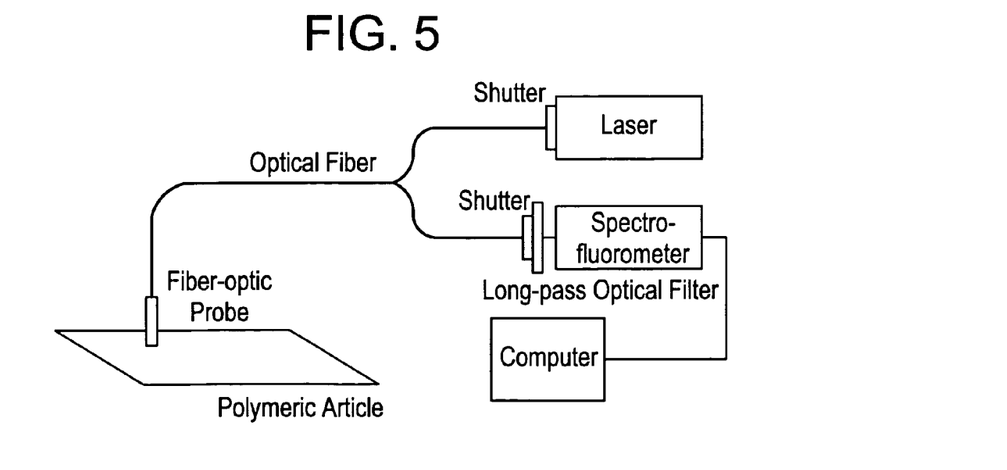
FIG. 5 schematically illustrates the setup employed for fluorescence data acquisition.

An experimental setup for analysis of the polymeric articles is shown in FIG. 5. Fluorescence measurements of polymeric articles were performed using a miniature 355 nanometer (nm) laser (Nanolase, France) and a portable spectrofluorometer. The spectrofluorometer (Ocean Optics, Inc., Dunedin, Fla., Model ST2000) was equipped with a 200 micrometer (μm) slit, 600 grooves per millimeter (grooves/mm) grating blazed at 400 nm and covering the spectral range of 250 nm to 800 nm with an efficiency of greater than 30%, and a linear charge coupled device array (CCD-array) detector. Light from the laser was focused into one of the arms of a "six-around-one" bifurcated fiber-optic reflection probe (Ocean Optics, Inc., Model R400-7-UV/VIS). Emission light from the sample was collected when the common end of the fiber-optic probe was positioned near the sample at a 0 or 45° angle to the normal to the surface. The second arm of the probe was coupled to the spectrometer. In some experiments, excitation light was blocked from entering the spectrometer with a long-pass optical filter. Processing of collected spectra was performed using KaleidaGraph (Synergy Software, Reading, Pa.).

Figure 6:
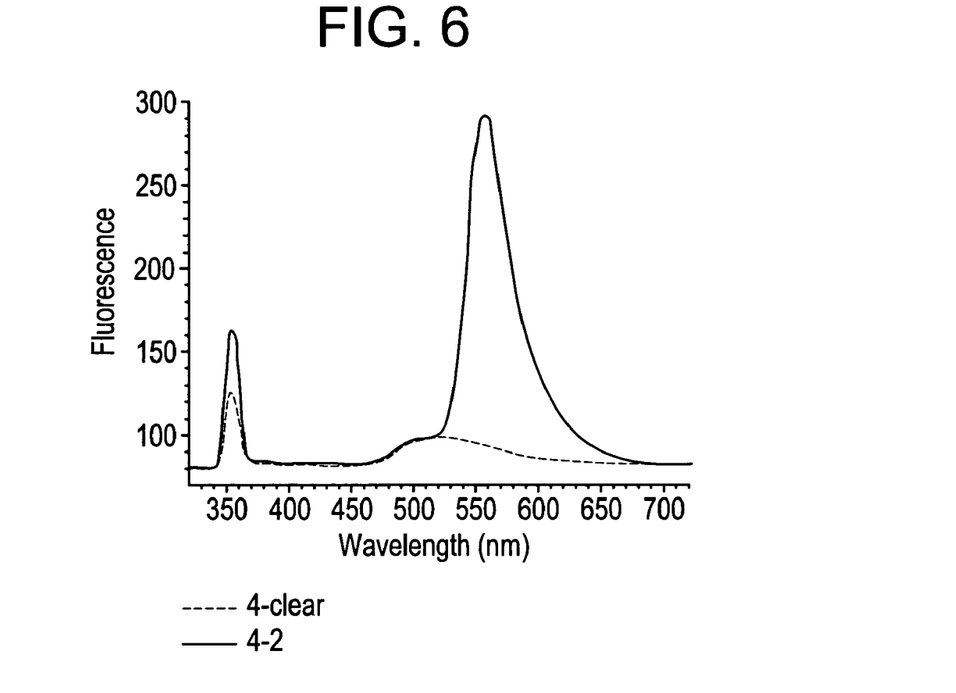
FIG. 6 is a graphical illustration of fluorescence versus wavelength for disks molded from polymer without a fluorophore, with and without a reagent spot.
Figure 7:
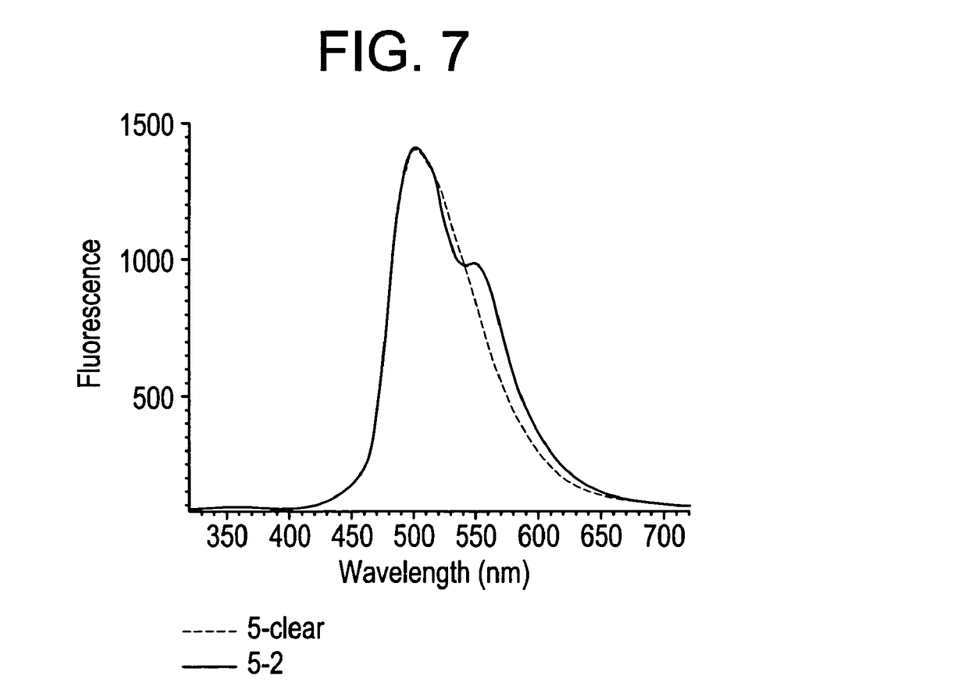
FIG. 7 is a graphical illustration of fluorescence (normalized intensity) versus wavelength for disks molded from a tagged polymer with a fluorophore, with and without a reagent spot.

Under the 355-nm excitation, fluorescence of a bare disk 4 (disk molded from a polymer without the fluorophore) was negligible as shown in FIG. 6 (see plot "4-clear"). In FIG. 6, under 355 nm excitation, fluorescence of a bare (i.e., non-coated) non-fluorescent disk 4 was negligible (dotted line), while fluorescence from the reagent spot was detectable with a strong signal (solid line), having a maximum emission at about 550 nm. Under 355 nm excitation, fluorescence of a bare fluorescent disk 5 was strong (dotted line), while fluorescence from the reagent spot was enhanced (solid line), as shown in FIG. 7. Fluorescence emission from the reagent spot at about 550 nm was enhanced as also illustrated in FIG. 7 (see plot 5-2). Note that the fluorescence plots 5-clear and 5-2 are presented in FIG. 7 with a normalized maximum intensity at peak (i.e., at about 500 nm).

In order to better visualize the enhancement of fluorescence signal from the coating, which is a property illustrating the synergy between the tagged polymer and the coating, a new curve was generated by subtracting the fluorescence spectrum of a reagent spot on the disk from the background fluorescence of that disk. These two fluorescence measurements on the disk are performed in two different locations on the disk (one on the coated area or reagents spot, and the other outside the coated area). After subtracting the two spectra, a fluorescence signature associated with the test portion is obtained.

Figure 8:
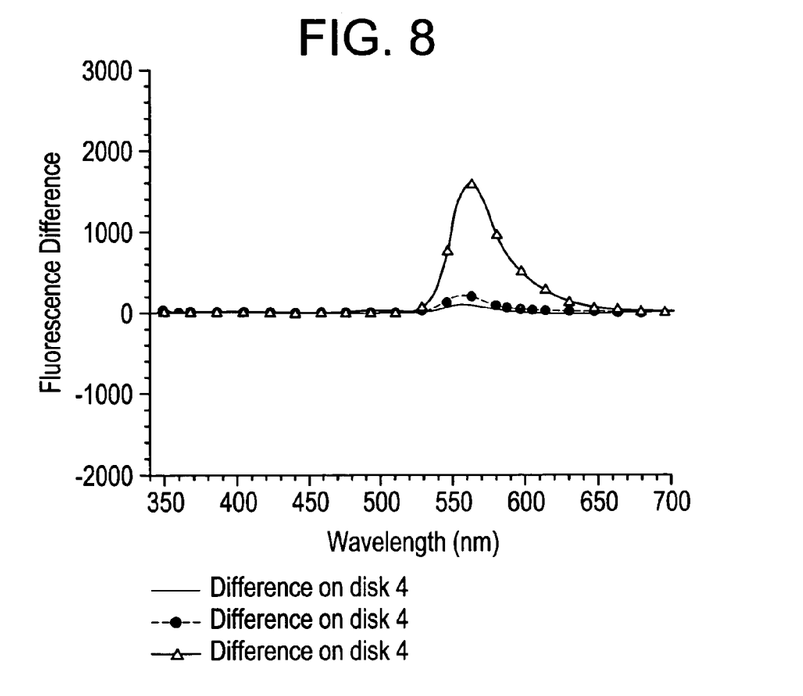
FIG. 8 is a graphical illustration of fluorescence difference versus wavelength for a disk molded from a polymer without a fluorophore, where three reagent spots had increasing reagent loadings, thus the fluorescence emission was increasing as a function of reagent concentration.

FIG. 8 illustrates the difference fluorescence spectra for reagent spots on disk 4. The three reagent spots had increasing reagent loadings, thus the fluorescence emission was increasing as a function of reagent concentration.

Figure 9:
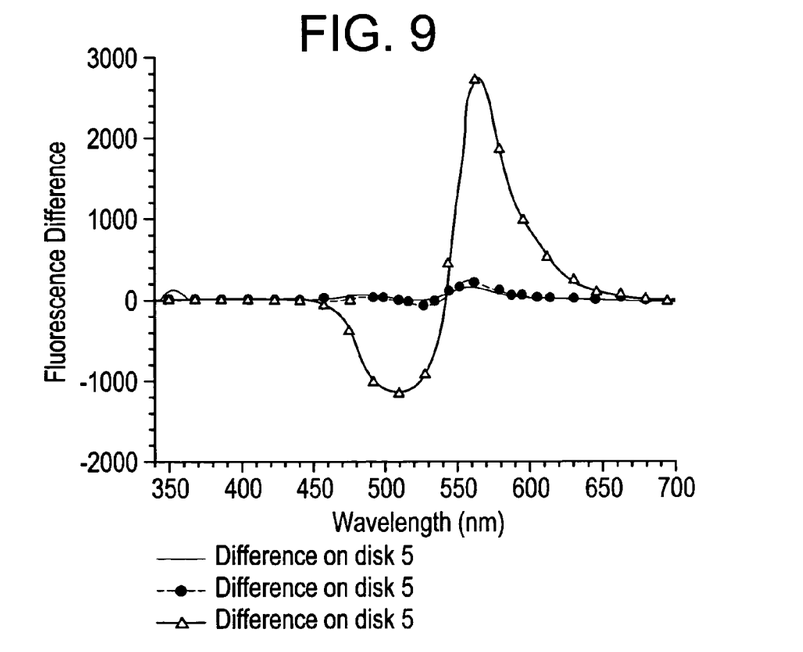
FIG. 9 is a graphical illustration of fluorescence difference versus wavelength for a disk molded from a tagged polymer with a fluorophore where three reagent spots had increasing reagent loadings (same as on the disk of FIG. 8), thus the fluorescence emission was increasing as a function of reagent concentration.

FIG. 9 illustrates the difference fluorescence spectra for reagent spots on disk 5. The three reagent spots had increasing reagent loadings (same as on disk 4), thus the fluorescence emission was increasing as a function of reagent concentration.

However, as shown in FIGS. 6 and 7, the intensities of the reagent spots deposited onto disk 5 were larger when compared to respective reagent spots on disk 4.

The increase in fluorescence intensity of reagent spot on the disk made with the tagged polymer (disk 5) is provided by the more effective excitation of fluorescence of the reagent spot by the fluorescence of the disk substrate itself. This is a clear illustration of the fluorescence synergy or "cross-talk" between the tagged substrate layer and the adjacent layer (coating).

This illustrates that the increase in fluorescence intensity at a reagent spot compared to a standard can be used as a method to authenticate a tagged article. In one embodiment, the authentication of the article will comprise measuring the fluorescence difference between a coated area and a non-coated area of the article. In a further embodiment, the authentication of the article will include depositing a reagent spot (or sensor spot) on the article.

Note that the curve generated from the difference between the fluorescence emission at the spot and outside the spot also provides valuable information useful to the authentication of a disk. In this embodiment, the emission detected from the fluorescent disk exhibits a decrease (or "dip") in presence of a reagent spot and a peak at a new maximum. This decrease (or "dip") in fluorescence emission has a predetermined spectral profile and intensity and is used for authentication purposes.

In a further embodiment, the fluorescence difference data can be further treated or analyzed by using for example a mathematical treatment of the fluorescence difference curve/data. Examples of mathematical treatment include derivatization (e.g., first derivative or second derivative), integration, Fourier transformation, or any type of data filtering or smoothing.

The previous examples clearly illustrate the possibility of authenticating a disk using a method based on fluorescence cross-talk between adjacent layers. In addition, the examples present methods of tagging for authentication purposes that are based on the creation of adjacent layers exhibiting fluorescence cross-talk. Various methods of authenticating and/or performing the detection are also discussed.

By involving both the layer comprising a taggant and another layer (e.g., an easily applicable adjacent layer), these methods allow for the individual marking/coding of each article. They also provide a multi-layer security approach with independent security layers that have to be combined in a certain way. Although the resin supplier controls the tagged resin used for the substrate and the coating supplier controls the special coating, the manufacturer controls the assembly and code creation. Therefore, the manufacture may retain the authentication code secret; thereby retaining greater control and security. Although these methods are especially desirable for optical disk authentication, they translate to other applications including, but not limited to, packaging (e.g., media packaging, drug packaging, and other product packaging), official documents and articles (such as ID cards, visas, bank and credit cards, and the like), and automotive parts (e.g., plastic parts that are replaceable upon damage or wear such as bumpers, mirror housings, consoles, interior buttons and switches, handles, wheel covers, radiator caps, gas tank caps, filters/filter housings, brake pads, airbag systems, accessories (e.g., sunroof, spoilers, bike racks, and the like), and the like). Examples of possible media to which the present method applies include, for example, optical and magneto-optical media formats, such as compact discs (CD) (e.g., recordable compact disc (CD-R), rewritable compact disc (CD-RW), and the like), magneto-optical discs, digital versatile discs (e.g., DVD-5, DVD-9, DVD-10, DVD-18, DVD-R, DVD-RW, DVD+RW, DVD-RAM, HD-DVD, and the like), Blu-Ray discs, enhanced video discs (EVD), and recordable and re-writable Blu-Ray discs, and the like.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An authenticatable article, comprising:
   a polymer layer comprising a first taggant; wherein the polymer layer comprises polycarbonate-siloxane copolymers; and
   a second taggant disposed adjacent to the first taggant, wherein the relative relationship of the first taggant and the second taggant is such that at least one of the first taggant and the second taggant when excited by a light source causes an alteration in an emission from the other of the first taggant and the second taggant.

2. The authenticatable article of claim 1, wherein the second taggant is disposed in a selected location on a surface of the polymer layer, wherein the selected location is only a portion of the surface.

3. The authenticatable article of claim 1, wherein the second taggant is disposed in a coating layer and wherein the coating layer is non-uniform and causes a different alteration of the emission from different areas of the article.

4. The authenticatable article of claim 1, wherein two coating layers are disposed on the polymer layer in a predetermined arrangement such that the alteration of the emission enables the article to be authenticated.

5. The authenticatable article of claim 1, wherein the second taggant comprises a fluorophore.

6. The authenticatable article of claim 1, wherein the alteration is a synergistic alteration.

7. The authenticatable article of claim 1, wherein when the coating layer and the polymer layer are illuminated, a photoluminescence emission from the first taggant causes an authenticatable emission from the second taggant.

8. The authenticatable article of claim 1, wherein at a detection wavelength a ratio of a second taggant excitation coefficient to a first taggant excitation coefficient is less than or equal to about 10%.

9. The authenticatable article of claim 8, wherein the ratio is less than or equal to about 1%.

10. The authenticatable article of claim 9, wherein the ratio is less than or equal to about 0.1%.

11. The authenticatable article of claim 1, wherein the second taggant is disposed in a coating layer and when the coating layer and the polymer layer are illuminated, a photoluminescence emission from the first taggant causes an emission from the second taggant, and wherein a combined emission from the first taggant and the second taggant are authenticatable.

12. The authenticatable article of claim 1, wherein the article is a DVD and wherein the first taggant is in a first portion of the DVD and the second taggant is in a second portion of the DVD, and wherein a metal layer is disposed between the first portion and the second portion.

13. The authenticatable article of claim 1, wherein the article is a DVD and wherein the first taggant is in a first portion of the DVD and the second taggant is in an adhesive, wherein the adhesive is disposed between the first portion and a second portion of the DVD.

14. The authenticatable article of claim 1, wherein at least one of the first taggant and the second taggant is at least partially dysfunctional, forming a pattern.

15. The authenticatable article of claim 1, wherein the second taggant is disposed in at least a portion of a housing disposed around the polymer layer.

16. The authenticatable article of claim 1, wherein the article is a DVD and wherein the first taggant is in a first substrate of the DVD and the second taggant is in a second substrate of the DVD, and wherein a metal layer is disposed between the first substrate and the second substrate.

17. The authenticatable article of claim 1, wherein the article is a DVD and wherein the first taggant is in a first substrate of the DVD and the second taggant is in an adhesive, wherein the adhesive is disposed between the first substrate and a second substrate of the DVD.

18. The authenticatable article of claim 1, wherein the first taggant is located in a different layer than the second taggant.

19. The authenticatable article of claim 1, wherein at least one of the first taggant and the second taggant can cause a synergistic alteration in the emission from the other of the first taggant and the second taggant.

20. The authenticatable article of claim 1, wherein at least one of the first taggant and the second taggant comprises chromone.

* * * * *